Patented Aug. 14, 1945

2,382,700

UNITED STATES PATENT OFFICE 2,382,700

COMPOUNDED LUBRICATING OIL

Lawrence T. Eby, Roselle, N. J., assignor to Standard Oil Development Company, a corporation of Delaware No Drawing. Application December 31, 1943, Serial No. 516,545

11 Claims. (Cl. 252—45)

This invention relates to a method of preventing the deterioration of organic materials, and it relates more particularly to a new type of additive for improving the properties of mineral lubricating oils.

In accordance with the present invention, a small quantity of a high molecular weight secondary or tertiary aliphatic mercaptan, when added to an organic material, reduces the tendency of such material to deteriorate in the presence of oxygen, and such compounds are particularly valuable when added to mineral lubricating oils, since the normal corrosiveness of such oils toward copper-lead and similar bearings now widely used in automotive engines is greatly inhibited by the presence of such compounds. Corresponding primary mercaptans are comparatively ineffective for the purpose.

The mercaptans employed in accordance with the present invention are characterized by being aliphatic mercaptans having from about five to about thirty carbon atoms in the molecule and by having at least one sulfhydryl group which is joined to a carbon atom, which in turn is joined to at least two other carbon atoms which are parts of aliphatic groups. The hydrocarbon chains of the mercaptans may be straight or branched and may be entirely saturated or may contain unsaturated linkages. Di-mercaptans and other compounds containing more than one sulfhydryl group may be employed. Various substituents may be present in the molecule such as carboxyl, hydroxyl, alkoxy, nitro, keto, amino, aldehydo, cyano, cyanate, thiocyanate, isothiocyanate, amido, sulfo, phosphate, thiophosphate, phosphonate, sulfonate or ester groups, metal substituted carboxyl and hydroxyl groups, halogen atoms, etc. The metal mercaptides of the above described mercaptans, e. g., the copper mercaptide of tert.-octyl mercaptan, have also been found to impart anti-corrosive properties to lubricating oils.

Instead of pure single compounds, the additives for the lubricating oils and other organic materials may consist of mixtures of mercaptans obtained by reacting various unsaturated hydrocarbon mixtures with hydrogen sulfide. Examples of suitable high molecular weight hydrocarbon mixtures which may be used to advantage in this manner are the bottoms obtained after removing the diolefin and lower boiling fractions from the product obtained by cracking gas oil in the presence of steam; the polymer product obtained by polymerizing a C₄ cut unsaturated material in the presence of phosphorus pentoxide deposited on pumice; the polymerized residue of hydrocarbon material obtained as a by-product in the treatment of C₄ cut material with sulfuric acid to form butyl alcohol; and the polymerized material obtained as bottoms in the debutanization of light petroleum fractions. All such materials are more or less unsaturated and may be readily reacted with hydrogen sulfide in the presence of a catalyst to form secondary and tertiary mercaptans suitable for use in accordance with the present invention.

Specific compounds which are particularly preferred for use as lubricating oil additives are:

2,4,4-trimethylpentane-2-thiol
α-Tert.-octyl ethyl mercaptan
Tert.-dodecyl mercaptan
9-mercapto-1-octadecanol
Mono-and di-mercaptans from dipentene and hydrogen sulfide
Cyclohexanethiol
Methyl cyclohexanethiol
Dimethyl cyclohexanethiol
Chlorocyclohexanethiol
8-mercapto-1-cyano-octadecane
9-mercapto-octadecanamide
2,4-dimethyl hexane-2-thiol
3,5-dimethyl hexane-3-thiol
2,2,4,6,6-pentamethyl heptane-4-thiol
2,4,4,6,6-pentamethyl heptane-2-thiol
2-methyl pentane-2-thiol
2-methyl butane-2-thiol
2,3-methyl-3-mercapto-1-butanol
2,3-dimethyl-1-butene-3-thiol
4-methyl-1-pentene-4-thiol
4-methyl-2-pentene-4-thiol
Octane-2-thiol
Reaction product of oleyl alcohol and hydrogen sulfide
α-Tert.-octyl methyl mercaptan
Reaction products of hydrogen sulfide with unsaturated fatty oils, such as linseed oil, oiticica oil, etc.
Tertiary dodecyl mercaptan from triisobutylene and hydrogen sulfide
Tertiary hexadecyl mercaptan from tetraisobutylene and hydrogen sulfide
Reaction product of a wax olefin and hydrogen sulfide.

Generally, the additives of the present invention are most advantageously blended with lubricating oil base stocks in concentrations between the approximate limits of 0.02% and 5%, and preferably from 0.1% to 2%, although larger amounts may be employed. The exact amount to be used depends to some extent on the particular compounds used, the characteristics of the mineral oil base, and the conditions under which the lubricant is to be employed. When used as additives for other organic materials, the amount to be used will depend upon the nature of the material being treated, but will always be a small amount relative to the oxidizable substance itself.

Mercaptans of the type herein described may be conveniently prepared by reaction of an olefin with hydrogen sulfide in the presence of a suitable catalyst, e. g., stannic chloride. Satisfactory practical methods for the preparation of several species of these compounds are described in the following examples, in which are also given the results of various tests of the usefulness of the compounds in reducing the corrosiveness of the lubricating oils. The examples are given by way of illustration only and are not to be considered as limiting the scope of the invention in any way.

EXAMPLE 1

A glass reactor was charged with 2,240 grams (20 mols) of diisobutylene and 42 cc. of anhydrous stannic chloride. Hydrogen sulfide was bubbled into the solution. A rise in temperature was noted and soon a white cloud appeared and later a yellow precipitate formed which turned to a yellowish brown in its final stage. The reaction flask was cooled with running tap water, the temperature inside the flask being about 40°–50° C. After 4 hours the temperature began to fall and the reaction was stopped after 5 hours. The reaction mixture was steam distilled, yielding 2,535 grams of an organic layer which came over with 3 liters of water. Further steam distillation carried over only a small layer of organic material which was discarded.

The retained organic layer was distilled, without drying, through a column packed with glass helices. The pure tert.-octyl mercaptan (2,4,4-trimethylpentane-2-thiol) boiling at 76°–77° C./50 mm. weighed 2,286 grams, the yield corresponding to 75% of theoretical.

EXAMPLE 2

In this preparation boron fluoride was used as a catalyst for the reaction between diisobutylene and hydrogen sulfide. A continuous reactor was employed consisting of a 1¼ in. x 3 ft. glass column packed with about 4 mesh pumice. The hydrogen sulfide feed (about 50–60 cc./sec.) was mixed with about 1% (about 0.5 cc./sec.) of boron fluoride before the gases entered the top of the column. Liquid diisobutylene (at room temperature) was dropped into the top of the column at about 10 cc./min. Most of the reaction took place in the upper third portion of the column. There was considerable heat of reaction which limited the rate of diisobutylene addition. On a larger scale the heat would best be dissipated from the reaction chamber by some means of cooling. The exit gases were vented to an absorber, but the excess hydrogen sulfide could, if so desired, be recycled. The exit gases also contained boron fluoride. The liquid product was drained from the bottom of the column and washed with water and sodium bicarbonate solution to remove boron fluoride. It was then fractionally distilled to recover pure tert.-octyl mercaptan representing about 85% of the crude product. The balance of the crude product was found to be unreacted diisobutylene and a high boiling residue which was mostly tetraisobutylene.

EXAMPLE 3

A preparation identical with Example 2 was made except that a jacket surrounding the reaction tube was used to dissipate the heat. Cooling water was passed through the jacket during the preparation, the jacket temperature being maintained at about 23° C. Upon distillation of the crude product withdrawn from the bottom of the reactor 81% of pure mercaptan was obtained.

EXAMPLE 4

219 grams (2 mols) of 95% acetic anhydride and 280 grams (2.5 mols) of diisobutylene were placed in a 1-liter 3-neck round bottom flask equipped with thermometer and stirrer. The solution was cooled in an ice bath and boron fluoride passed in. The temperature was kept down to 0°–10° C. most of the time and was not allowed to rise above 20° C. After about 4 hours catalyst addition was stopped and the reaction mixture was allowed to stand at room temperature overnight. The mixture was then shaken up with water and allowed to separate into two layers. The organic layer was washed with sodium bicarbonate solution, dried over anhydrous calcium chloride and fractionally distilled through a column packed with glass helices. A good yield of a tert.-octenyl methyl ketone boiling between 186° and 192° C. was obtained. Analysis of this material:

| Found | Calculated for $C_{10}H_{18}O$ |
|---|---|
| 77.47% C | 77.92% C |
| 11.82% H | 11.70% H |

This tert-octenyl methyl ketone was placed in a stainless steel bomb with 2% by weight of copper chromite and hydrogenated with about 100 atmospheres of hydrogen at 175° C. The product was filtered and fractionally distilled to give a high yield of tert.-octyl methyl carbinol boiling at 95.5° C./25 mm. and having a refractive index of 1.4331. It showed the following analysis:

| Found | Calculated for $C_{10}H_{22}O$ |
|---|---|
| 76.05% C | 75.95% C |
| 14.00% H | 13.92% H |

The corresponding tert.-octyl methyl carbinyl bromide (or tert.-octyl ethyl bromide) was prepared by reaction of the tert.-octyl methyl carbinol with phosphorus tribromide. 79 grams (0.5 mol) tert.-octyl methyl carbinol was placed in 100 cc. of light petroleum naphtha (B. P. 160–240° F.) and stirred while 45 grams (⅙ mol) of phosphorus tribromide was added over 15 minutes. The temperature rose to 43° C. and then decreased. The mixture was heated to 90° C. under reflux for several hours. The clear top layer was removed by decantation and washed with 100 cc. of concentrated sulfuric acid and twice more with 50 cc. portions of concentrated sulfuric acid. Then it was washed with water and finally with aqueous sodium bicarbonate and dried over anhydrous potassium carbonate. The product was filtered and distilled through a packed column to obtain 66.7 grams of colorless liquid boiling at 93°–95° C./25 mm. and having a refractive index $n_D^{20}=1.4523$. An analysis showed 37.79% bromine, while the calculated amount for $C_{10}H_{21}Br$ is 36.20%. Another sample prepared in the same manner and having the same physical properties gave 36.46% bromine when analyzed.

The corresponding mercaptan from α-tert.-octyl ethyl bromide was prepared by reaction with sodium hydrosulfide. Hydrogen sulfide was bubbled into a mixture of 13.3 grams (0.333 mol) of powdered sodium hydroxide in 95% ethanol until 14.3 grams were absorbed. 60 grams (0.27 mol) of α-tert.-octyl ethyl bromide were added and the mixture heated under reflux over night. Most of the alcohol was removed by distillation and the residue made acid with dilute sulfuric acid and the product extracted with ether. The ether layer was dried, filtered and distilled through a column packed with glass helices. A good yield of α-tert.-octyl ethyl mercaptan was obtained boiling at 92°–93° C./25 mm. and having a refractive index $n_D^{20}=1.4513$. This product was free of bromine and contained the theoretical amount of sulfur.

| Found | Calculated for $C_{10}H_{22}S$ |
| --- | --- |
| 18.41% S | 18.39% S |

Titration with iodine and by the silver nitrate-pyridine method showed this sulfur to be mercaptan sulfur. The product was soluble in an aqueous-alcohol-caustic soda solution.

This α-tert.-octyl ethyl mercaptan can also be made directly from the alcohol and hydrogen sulfide.

EXAMPLE 5

Blends of various high molecular weight secondary and tertiary mercaptans were made in lubricating oil base stock consisting of a well refined solvent extracted paraffinic type mineral lubricating oil of S. A. E. 20 viscosity grade. These blends and a sample of the unblended base oil were submitted to a corrosion test designed to measure the effectiveness of the products in inhibiting the corrosiveness of a typical mineral lubricating oil toward the surfaces of copper-lead bearings. The test was conducted as follows:

500 cc. of the oil was placed in a glass oxidation tube (13″ long and 2⅝″ diameter) fitted at the bottom with a ¼″ bore air inlet tube perforated to facilitate air distribution. The oxidation tube was then immersed in a heating bath so that the oil temperature was maintained at 325° C. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four-hour period the bearings were removed, washed with naphtha and weighed to determine the amount of loss by corrosion. The bearings were then repolished (to increase the severity of the test), reweighed, and then subjected to the test for additional four-hour periods. The cumulative weight losses of the bearings used in the tests at the end of the various four-hour periods are given in the following table.

Table

| Additive | Cumulative bearing weight loss (mg. per 25 sq. cm. surface) | | | | |
| --- | --- | --- | --- | --- | --- |
| | 4 hrs. | 8 hrs. | 12 hrs. | 16 hrs. | 20 hrs. |
| Base oil | 0 | 170 | | | |
| 0.5% tert.-octyl mercaptan (2, 4, 4-trimethylpentane-2-thiol) | 5 | 8 | 26 | 257 | |
| 1.0% tert.-octyl mercaptan (2, 4, 4-trimethylpentane-2-thiol) | 2 | 10 | 21 | 213 | |
| 0.5% tert.-dodecyl mercaptan¹ | 0 | 0 | 3 | 253 | |
| 1.0% tert.-dodecyl mercaptan¹ | 0 | 0 | 0 | 85 | 352 |
| 0.5% "Lorol" mercaptan² | 17 | 42 | 200 | | |
| 1.0% "Lorol" mercaptan² | 27 | 123 | | | |
| 0.5% amyl mercaptan | 129 | | | | |
| 1.0% amyl mercaptan | 94 | 112 | | | |
| 0.5% alpha-tert.-octyl ethyl mercaptan³ | 8 | 15 | 37 | 283 | |
| 1.0% alpha-tert.-octyl ethyl mercaptan³ | 20 | 27 | 36 | 76 | 280 |

¹ Prepared by the reaction of triisobutylene with $H_2S$.
² Mixture of mercaptans of 10 to 14 carbon atoms per molecule derived from a product obtained in the catalytic hydrogenation of cocoanut oil acids.
³ Prepared by the method described in Example 4.

The results of the above tests show that the secondary and tertiary mercaptans of the present invention were quite effective in reducing the corrosiveness of the lubricating oil toward copper-lead bearings. The primary mercaptans, on the other hand, had relatively little effect in this regard.

Although the secondary and tertiary mercaptans of the present invention may be employed as the sole additives in lubricating compositions, their use in conjunction with other materials, particularly with detergent type additives, will often be found advantageous. It is thus contemplated to use these mercaptans in lubricating compositions containing such other addition agents as metal phenates, metal alkyl phenol sulfides, metal organo-phosphates, thiophosphates, phosphites and thiophosphites, metal alcoholates and ketonates, metal sulfonates, metal carboxylates, metal phosphonates, metal xanthates and thioxanthates, metal thiocarbamates, and the like.

Thus, the addition agents of the present invention may be used in mineral lubricating oils containing one or more of the following representative materials:

Barium tert.-octyl phenol sulfide
Calcium mahogany sulfonates
Calcium dichlorostearate
Nickel amyl xanthate
Aluminum naphthenate
Zinc methyl cyclohexyl dithiophosphate
Tin salt of wax alkylated phenol sulfide
Barium octadecylate
Magnesium cetyl phenate
Barium diamyl phenol sulfide
Zinc diisopropyl salicylate
Calcium cetyl phosphate The lubricating oil base stocks employed in the blended lubricating oils of this invention may be straight mineral lubricating oils, or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloro-ethyl ether, propane, nitrobenzene, croton-aldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additives present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed Diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in gasoline engine service, oils of higher viscosity index are often required, for example up to 75 or 100, or even higher, viscosity index.

In addition to the materials to be added according to the present invention, other agents may also be used such as dyes, pour depressors, heat thickened fatty oils, sulfurized fatty oils, organo-metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds and the like, may also be employed.

Assisting agents which are particularly desirable are the higher alcohols having eight or more carbon atoms and preferably 12 to 20 carbon atoms. The alcohols may be saturated straight and branched chain aliphatic alcohols such as octyl alcohol, $C_8H_{17}OH$, lauryl alcohol, $C_{12}H_{25}OH$, cetyl alcohol, $C_{16}H_{33}OH$, stearyl alcohol, sometimes referred to as octadecyl alcohol, $C_{18}H_{37}OH$, and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol, or mixtures of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes the wool fat, sperm oil or other natural products rich in alcohols may be used per se. Products prepared synthetically by chemical processes may also be used, such as alcohols prepared by the oxidation of petroleum hydrocarbons, e. g., paraffin wax, petrolatum, etc.

In addition to being employed in crankcase lubricants and in extreme pressure lubricants, the additives of the present invention may also be used in industrial lubricants, process oils, engine flushing oils, turbine oils, insulating and transformer oils, steam cylinder oils, slushing and rust preventive compositions, and greases. Also their use in motor fuels, Diesel fuels and kerosene is contemplated. Since these additives exhibit antioxidant properties and are believed also to possess ability to modify surface activity, they may be employed in asphalts, road oils, waxes, fatty oils of animal or vegetable origin, soaps, and plastics. Similarly, they may be used in natural and synthetic rubber compounding both as vulcanization assistants and as antioxidants, and generally they may be used in any organic materials subject to deterioration by atmospheric oxygen.

The present invention is not to be considered as limited by any of the examples described herein, which are given by way of illustration only, but is to be limited solely by the terms of the appended claims.

I claim:

1. An organic material containing as an additive a small quantity, sufficient to substantially stabilize said material against oxidation, of an aliphatic mercaptan containing at least 5 carbon atoms per molecule and in which a sulhydryl group is joined to a carbon atom which is in turn joined to at least 2 other carbon atoms which are parts of aliphatic groups.

2. A hydrocarbon material containing a small quantity, sufficient to substantially stabilize said material against oxidation, of an aliphatic mercaptan containing at least 5 carbon atoms per molecule and in which a sulfhydryl group is joined to a carbon atom which is in turn joined to at least 2 other carbon atoms which are parts of aliphatic groups.

3. A mineral lubricating oil containing a small quantity, sufficient to substantially stabilize said oil against oxidation, of an aliphatic mercaptan containing at least 5 carbon atoms per molecule and in which a sulfhydryl group is joined to a carbon atom which is in turn joined to at least 2 other carbon atoms which are parts of aliphatic groups.

4. A mineral lubricating oil containing a small quantity, sufficient to substantially stabilize said oil against oxidation, of a tertiary aliphatic mercaptan containing at least 5 carbon atoms.

5. A mineral lubricating oil containing a small quantity, sufficient to substantially stabilize said oil against oxidation, of a compound of the formula

where $R_1$ and $R_2$ are aliphatic groups and $R_3$ is a member of the group consisting of hydrogen and aliphatic groups, and in which at least 5 carbon atoms are present in the molecule.

6. A mineral lubricating oil containing a small quantity, sufficient to substantially stabilize said oil against oxidation, of a compound of the formula

where $R_1$, $R_2$, and $R_3$ are alkyl groups, and in which from 5 to 30 carbon atoms are present in the molecule.

7. A mineral lubricating oil containing a small quantity, sufficient to substantially stabilize said oil against oxidation, of 2,4,4-trimethyl pentane-2-thiol.

8. A mineral lubricating oil containing a small quantity, sufficient to substantially stabilize said oil against oxidation, of alpha tertiary octyl ethyl mercaptan.

9. A mineral lubricating oil containing a small quantity, sufficient to substantially stabilize said oil against oxidation, of tert.-dodecyl mercaptan.

10. A mineral lubricating oil containing a small quantity, sufficient to substantially stabilize said oil against oxidation, of the reaction product of diisobutylene and hydrogen sulfide.

11. A mineral lubricating oil containing a small quantity, sufficient to substantially stabilize said oil against oxidation, of the reaction product of triisobutylene and hydrogen sulfide.

LAWRENCE T. EBY.